US012561069B2

(12) United States Patent
Vlasov et al.

(10) Patent No.: US 12,561,069 B2
(45) Date of Patent: Feb. 24, 2026

(54) SAFE AREA FOR CRITICAL CONTROL DATA

(71) Applicant: Micron Technology, Inc., Boise, ID (US)

(72) Inventors: Aleksei Vlasov, Boise, ID (US); Tim Evans, Boise, ID (US); John E. Lauber, Boise, ID (US); Larry Morkre, Boise, ID (US); Daniel B. Willie, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/205,036

(22) Filed: Jun. 2, 2023

(65) Prior Publication Data

US 2023/0393760 A1      Dec. 7, 2023

Related U.S. Application Data

(60) Provisional application No. 63/348,447, filed on Jun. 2, 2022.

(51) Int. Cl.
*G06F 3/06* (2006.01)
(52) U.S. Cl.
CPC .......... *G06F 3/0619* (2013.01); *G06F 3/0644* (2013.01); *G06F 3/0679* (2013.01)

(58) Field of Classification Search
CPC ..... G06F 3/0644; G06F 3/0679; G06F 3/0619
USPC ......................................................... 711/103
See application file for complete search history.

(56) References Cited

U.S. PATENT DOCUMENTS

| | | | |
|---|---|---|---|
| 11,138,110 B1* | 10/2021 | Luo ..................... | G06F 12/1009 |
| 2004/0188710 A1* | 9/2004 | Koren ................... | G06F 3/0619 |
| | | | 257/197 |
| 2011/0099325 A1* | 4/2011 | Roh ....................... | G06F 3/0679 |
| | | | 711/E12.008 |
| 2017/0177243 A1* | 6/2017 | Trika ................... | G06F 11/2094 |
| 2019/0310918 A1* | 10/2019 | Frolikov ............. | G06F 11/1446 |
| 2019/0310921 A1* | 10/2019 | Lee ....................... | G06F 3/0616 |
| 2019/0340058 A1* | 11/2019 | Sasidharan ........... | G06F 11/079 |
| 2020/0192798 A1* | 6/2020 | Natu ....................... | G06F 12/12 |
| 2022/0187900 A1* | 6/2022 | Bhanutej ............... | G06F 1/3296 |

* cited by examiner

*Primary Examiner* — Gautam Sain
(74) *Attorney, Agent, or Firm* — Brooks, Cameron & Huebsch, PLLC

(57) ABSTRACT

A method includes writing information comprising a state of a computing system to a safe area of a memory sub-system that is deployed within the computing system. The method further includes determining that a power event involving the computing system has occurred. The method further includes causing, responsive to the determination that the power event has occurred, the information written to the safe area of the memory sub-system to be written to or retrieved from a persistent memory area of the memory sub-system.

17 Claims, 4 Drawing Sheets

SAFE AREA FOR CRITICAL CONTROL DATA

PRIORITY INFORMATION

This application claims the benefit of U.S. Provisional Application No. 63/348,447, filed on Jun. 2, 2022, the contents of which are incorporated herein by reference.

TECHNICAL FIELD

Embodiments of the disclosure relate generally to memory sub-systems, and more specifically, relate to a safe area for critical control data.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
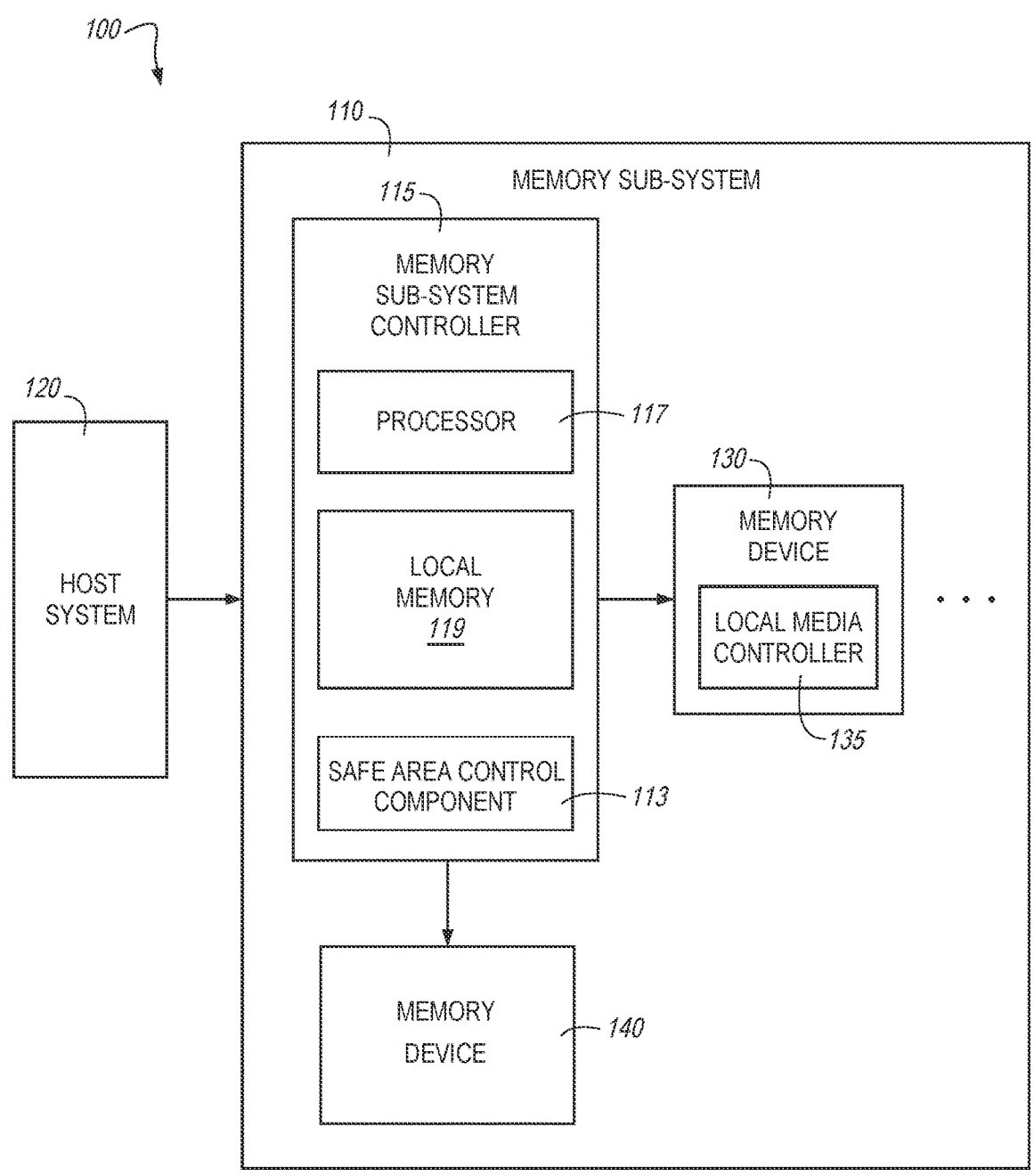
FIG. 1 illustrates an example computing system that includes a memory sub-system in accordance with some embodiments of the present disclosure.

Aspects of the present disclosure are directed to a safe area for critical control data in a memory sub-system and, more particularly to a safe area in a frontend portion of a memory sub-system that facilitates storage of critical control data. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area that can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

When a memory device experiences a power event (e.g., a power loss or power-up event), unintended behaviors may occur. This is particularly true in the case of an asynchronous power loss (e.g., an unexpected power loss event) and a subsequent power-up event. For example, because a memory device may not have time or resources to properly store or synchronize critical control data (e.g., state information corresponding to the memory device) when an asynchronous power loss occurs, unintended behaviors involving the memory device may transpire. Similarly, when the memory device is powered back on subsequent to the asynchronous power loss, errors or other unintended behaviors may occur due to the critical control data not being properly stored or synchronized.

Some approaches attempt to mitigate these issues by providing an external storage area (e.g., a NOR or EEPROM) storage area in an always-on (AON) domain associated with a computing system or other domain associated with the computing system that is protected from power events. However, because such approaches involve additional components (e.g., in the form of the external storage area and/or communication paths to couple the external storage area to the memory sub-system), they can introduce costs to the computing system not only as a result of the additional components, but also in terms of power and space required to house such components. Further, such approaches can suffer from shortcomings that can arise due to failures of the external storage areas and/or the communication paths coupling the external storage areas to the memory sub-system. Moreover, approaches that rely on these external storage areas can introduce issues due to management not only of the external storage areas, but also due to management of the data transferred between the external storage area and the memory sub-system.

In some other approaches control data or system data is stored in a file system storage area or within firmware of the computing system. In such approaches, the control data or system data is generally written to the file system storage area in a special file or through the implementation of a specialized flow. In these approaches, multiple requests or commands are generated to facilitate storage of the control data or system data. For example, responsive to a power down event, a traditional file system generally transfers the control data to the memory storage (e.g., to a file system storage area of the memory device) with multiple requests, which require extra synchronization. In contrast, embodiments herein describe approaches that utilize a "safe area" wherein the firmware receives signaling indicative of a power down event to synchronize and transfer control data directly to the memory device, thereby reducing an amount of time, power, and/or other computing resources consumed in previous approaches. Then upon a power up event in accordance with the safe area implementations described herein, the firmware processes commands at reduced functionality. Later, upon detection that control data has been restored into the safe area, a new synchronization event notifies the firmware to operate at full functionality. With a traditional file system approach, the firmware would not process any commands on power up until the file system reads in the control data which results in longer delays in processing, for example, additional commands (e.g., requests) that traverse communication paths of a computing system in comparison to the embodiments described herein.

Aspects of the present disclosure address the above and other deficiencies by providing a safe area for critical control data. For example, embodiments of the present disclosure provide for a safe area that is located within a frontend portion of a memory controller associated with the memory sub-system. The safe area can consist of an area within the frontend portion of the memory controller that is configured to store control data (e.g., state information) corresponding to the memory sub-system. That is, in contrast to approaches that rely on external storage areas, the safe area of the present disclosure is located within the memory controller and is therefore tightly coupled to the memory sub-system as opposed to being external to the memory sub-system. Further, in contrast to approaches that rely on the generation of multiple commands to synchronize control data in response to detection of a power event, aspects of the present disclosure require only two direct synchronization points—one synchronization point when a power loss event is detected and one synchronization point when a power-up event is detected.

Accordingly, aspects of the present disclosure can provide an improvement to the functioning of a memory sub-system and, hence to a computing system in which the memory sub-system is deployed by alleviating the need for an external storage area to perform operations involving critical control data in the presence of a power event. Further, aspects of the present disclosure can reduce a quantity of synchronization points generally required to perform operations involving critical control data in the presence of a power event, thereby reducing data traffic within a memory sub-system and/or reducing power consumption of the memory sub-system in the presence of a power event.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing device 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor. In some embodiments, the memory sub-system controller 115 is part of the hardware-based I/O path 310 and/or is coupled thereto illustrated in FIG. 3-1 and FIG. 3-2, herein.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a safe area control component 113. Although not shown in FIG. 1 so as to not obfuscate the drawings, the safe area control component 113 can include various circuitry to facilitate performance of operations described herein. The safe area control component 113 may be referred to herein in the alternative as a "controller" or a "processor," given the context of the disclosure. In some embodiments, the recovery component 113 can include special purpose circuitry in the form of an ASIC, FPGA, state machine, and/or other logic circuitry that can allow the safe area control component 113 to orchestrate and/or perform operations described herein involving the memory device 130 and/or the memory device 140.

In some embodiments, the memory sub-system controller 115 includes at least a portion of the safe area control component 113. For example, the memory sub-system controller 115 can include a processor 117 (processing device) configured to execute instructions stored in local memory 119 for performing the operations described herein. In some embodiments, the safe area control component 113 is part of the host system 110, an application, or an operating system.

In some embodiments, the memory sub-system 110, and hence the safe area control component 113, can be resident on a mobile computing device such as a smartphone, laptop, phablet, Internet-of-Things device, autonomous vehicle, or the like. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

Figure 2:
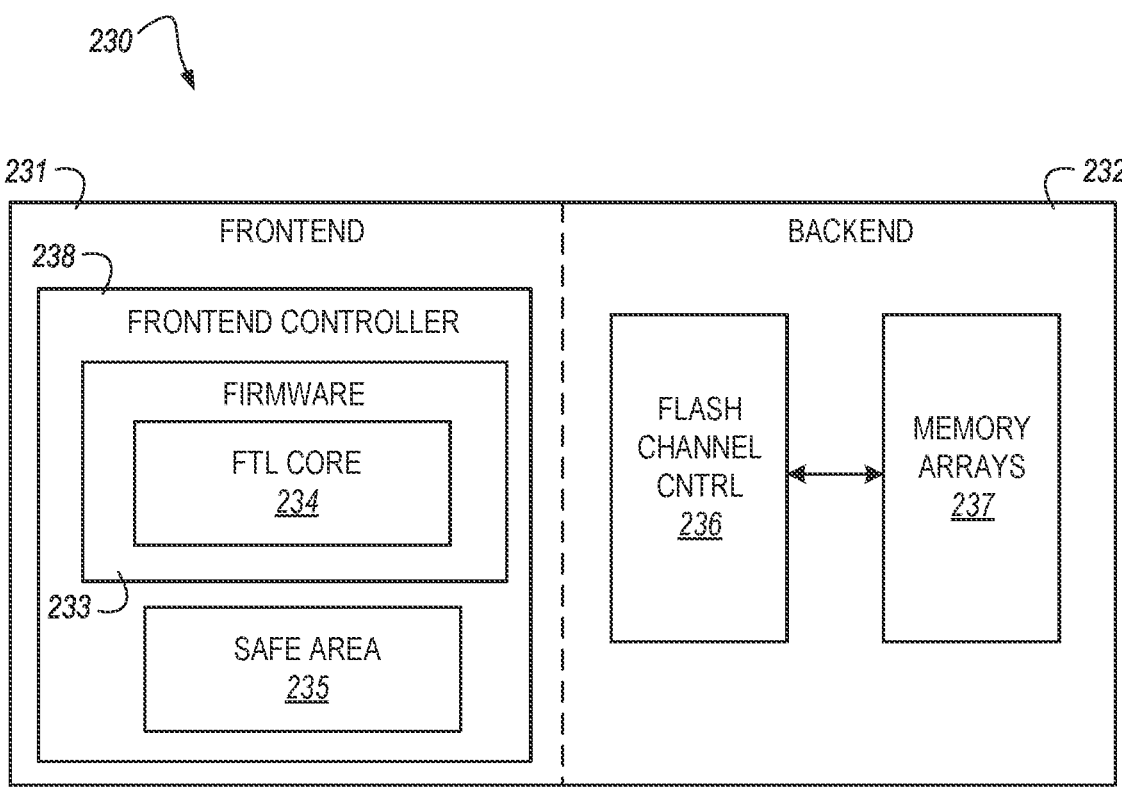
FIG. 2 illustrates an example memory device in accordance with some embodiments of the present disclosure.

FIG. 2 illustrates an example memory device 230 in accordance with some embodiments of the present disclosure. In some embodiments, the memory device 230 is analogous to the memory device 130 illustrated in FIG. 1, herein. As shown in FIG. 2, the memory device 230 includes a frontend portion 231 and a backend portion 232. The frontend portion 231 includes a frontend controller 238 that includes a firmware 233 portion, which further includes a flash translation layer (FTL) core 234. Further, the frontend portion 231 includes a safe area 235. The safe area 235 can include various components that are configured to retain data written to the safe area 235 in the event of a power event, such as an asynchronous power loss. For example, the safe area 235 can include capacitors, registers, latches, memory cells, etc. that are configured to maintain data states of data written to the safe area 235 when the memory device 230 is not powered (e.g., when the memory device 230 experiences a power loss event).

The safe area 235 can, in some embodiments, operate as a special area in a memory sub-system (e.g., the memory sub-system 110 illustrated in FIG. 1, herein) that can be managed by the FTL core 234. Accordingly, the safe area 235 can include a non-volatile memory which is persistent across all power-cycles and asynchronous power loss events involving the memory device 230 and/or the memory sub-system in which the memory device 230 is deployed. In some embodiments, data (e.g., information corresponding to a state of the memory device 230 and/or memory sub-system and FTL control data) can be written together to the safe area 235. This data can be is presented to the frontend portion 231 of the memory device 230 in the absence of any explicit memory control requirement or command, as described in more detail, herein. That is, in some embodiments, information corresponding to a state of the memory device 230 and/or memory sub-system and FTL control data can be written together to the safe area 235 in the without any explicit memory control requirement.

The data (e.g., the information corresponding to a state of the memory device 230 and/or memory sub-system and/or the FTL control data) can include Self-Monitoring, Analysis and Reporting Technology (SMART) data, such as SMART counter data, SMART monitoring data, etc., name server identification (NSID) hardware permission control (e.g., control data and state information corresponding to namespaces of the memory device 230), persistent configuration data (e.g., configuration information that is allowed to be modified during run-time of the memory device 230), and/or debugging and statistical data (e.g., PCIe information, power configuration information, vendor-specific statistics used for debugging operation, etc.), among other state information and control data.

The data written to the safe area 235 can be used to determine if any commands or operations were in-flight or being performed when the power-loss event occurred. This information can then be used to determine if there are any commands or operations that immediately need to be resent or completed on power-up of the memory device 230. For example, if a sanitization operation (e.g., an erase operation) was being performed but was not yet completed when the memory device 230 experienced the power loss event, the data from the safe area 235 can include an indication that such sanitization operation was not completed prior to the power loss event. In order to maintain data integrity and to avoid errors that can arise from a partial sanitization operation, performance of the sanitization operation may be prioritized on power-up of the memory device 230 based on the data from the safe area 235.

In some embodiments, the safe area 235 is loaded automatically on power-up and is written back to a location in the memory arrays 237 in the event of a power event (e.g., a power-loss event). In general, there is a single memory pointer that is used to identify an owner of each memory region (e.g., a portion of memory cells of the memory device 230) and a state associated with the memory region prior to the power-loss event. In such embodiments, each client that is using the memory device 230, for example in a high-speed computing cluster deployment, has a direct, cached, and fast access to data and applications across the entire high-speed computing cluster.

Utilization of the safe area 235 as described herein can allow improved access times in comparison to the approaches described above in the event of a power event. For example, utilization of the safe area 235 as described herein can allow for the safe area 235 to be accessed much sooner following a power event than approaches in which access of the entire memory device 230 (e.g., a full media and/or full NAND access) is available to the memory device 230. Further, write atomicity and protection (e.g., the safe area 235 may include capacitor circuitry as mentioned above to protect data written thereto when a power event occurs) is provided by the safe area 235 described herein. In addition, the safe area 235 allows for direct read/write capability (e.g., the safe area 235 does not require any special handling to be written to and/or read from the memory arrays 237). Moreover, the safe area 235 can provide simple parity protection for example, by implementing header signature and/or footer signature checks responsive to power events to ensure data integrity.

The backend portion 232 of the memory device 230 includes a controller (e.g., a flash channel controller 236) and memory arrays 237. In some embodiments, the memory arrays 237 comprise arrays of flash memory cells and can therefore provide non-volatile and/or persistent storage for the memory device 230.

In some embodiments, the memory device 230 may be part of a high-speed computing cluster in which multiple computing systems are provided access to the memory device 230. For example, the memory device 230 may be a cluster-shared memory that is shared between multiple central processing units of computing systems of a high-speed computing cluster. Embodiments are not so limited, however, and in some embodiments, the memory device 230 can be part of an individual computing system that is part of a high-speed computing cluster. In general, a computing cluster is a set of computing systems that operate in concert and can therefore behave as a single computing system.

In some embodiments, the safe area 235 can provide a direct read/write interface within the memory device 230 between central processing units (CPUs) of the high-speed computing cluster while ensuring that data written to the safe area 235 is persistent in the event of a power event, such as an asynchronous power loss event. In some embodiments, there are two direct synchronization points: a first direct synchronization point on power-up of the memory device 230 and a second direct synchronization point on power loss of the memory device 203, or vice versa. In general, these direct synchronization points refer to points where control of the safe area 235 is passed from the frontend 231 of the memory device 230 and the FTL core 234. Accordingly, in contrast to previous approaches, no further memory management is required to perform the features of the disclosure. Further, utilization of these two direct synchronization points can allow the memory device 230 to be accessible (e.g., readable and/or writable) by all the CPUs of a high-speed computing device provided the synchronization is properly handled by the firmware 233 during the two direct synchronization points. In general, the synchronization being "properly handled" by the firmware 233 means that the firmware 233 has coordinated null pointer checks, semaphore protection between threads is enabled, and/or mutex protection between the CPUs is enabled.

In some embodiments, the size of the safe area 235 can be limited by an amount of available space in the memory device 230. For example, the size of the safe area 235 can be limited be part of an asynchronous power loss capacitor budget and can therefore be limited by the asynchronous power loss capacitor budget, although embodiments are not so limited. In one embodiment, the size of the safe area 235 can be around 8 kilobytes (KB); however, the size of the safe area 235 can be less than 8 KB or greater than 8 KB depending on various factors of the memory device 230 and/or the total size of the asynchronous power loss capacitor budget. Although described above in terms of the asynchronous power loss budget (and in terms of a quantity of capacitors available in the asynchronous power loss budget), embodiments are not so limited, and the safe area 235 can include other types of persistent storage device, as described above.

Because data availability on power-up of a memory device 230 can play a crucial role in serialization and control of commands that are allowed to be serviced from a host (e.g., the host system 120 illustrated in FIG. 1, herein), particularly when the power-up event follows an asynchronous power loss event, providing an accurate and fast way to restore the memory device 230 to a state the memory device 230 was in prior to the power loss event can improve the functioning of a memory device 230 and, accordingly, a computing system in which the memory device 230 is deployed. Further, a time-to-ready page (e.g., timing requirements on power-up to ensure that the memory device 230 is fully operational upon power-up) can be critical in high-speed computing clusters where multiple CPUs are expecting coherent access to a shared memory device 230. Moreover, it is beneficial to service particular types of admin commands prior to other types of commands in case of a power-up event that follows an asynchronous power loss. As described above, utilization of the safe area 235 as described herein can alleviate these and other concerns, thereby providing an improvement to a computing system and, in particular, to a high-speed computing cluster environment.

In a non-limiting example, an apparatus includes a memory sub-system configured such that at least a first portion of the memory sub-system comprises a safe area 235 and at least a second portion comprises a persistent memory area 237. The memory sub-system can be analogous to the memory sub-system 110 illustrated in FIG. 1, herein. The apparatus can further include a controller (e.g., the safe area control component 113 illustrated in FIG. 1 and/or the frontend controller 238). The controller can be configured to cause information comprising a state of a computing system (e.g., the computing system 100 illustrated in FIG. 1, herein) in which the memory sub-system is deployed to be written to the safe area 235 of the memory sub-system. In some embodiments, the information comprising the state of the computing system includes self-monitoring, analysis and reporting technology information, name server identification hardware permission control information, persistent configuration information, debugging information, or any combination thereof.

The controller can be further configured to determine that a power event involving the computing has occurred and cause, responsive to the determination that the power event has occurred, the information written to the safe area 235 of the memory sub-system to be written to or retrieved from the persistent memory area 237 of the memory sub-system. The power event can be a power-up event or a power loss event, as described above. In embodiments in which the power event is a power loss event, the power loss event can be a controlled power down event or an asynchronous power loss event.

Continuing with this example, the controller can be further configured to determine that the power event is an asynchronous power loss event and cause, responsive to the determination that the power event is the asynchronous power event, the information written to the safe area 235 of the memory sub-system to be written to the persistent memory area 237 of the memory sub-system.

Embodiments are not so limited, however, and the controller can be configured to determine that the power event is a power-up power event and cause, responsive to the determination that the power event is the power-up power event, the information written to the persistent memory area 237 of the memory sub-system to be written to the safe area 235 of the memory sub-system. In this case, the controller can be configured to determine, based on the information written to the safe area 235 of the memory sub-system, that a particular operation is to be performed in response to the power-up event and cause performance of the particular operation. As described herein, the particular operation can be a sanitize operation, among other possible operations.

Figure 3:
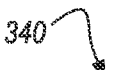
FIG. 3 illustrates an example high-speed computing cluster that includes a memory sub-system in accordance with some embodiments of the present disclosure.
Figure 3:
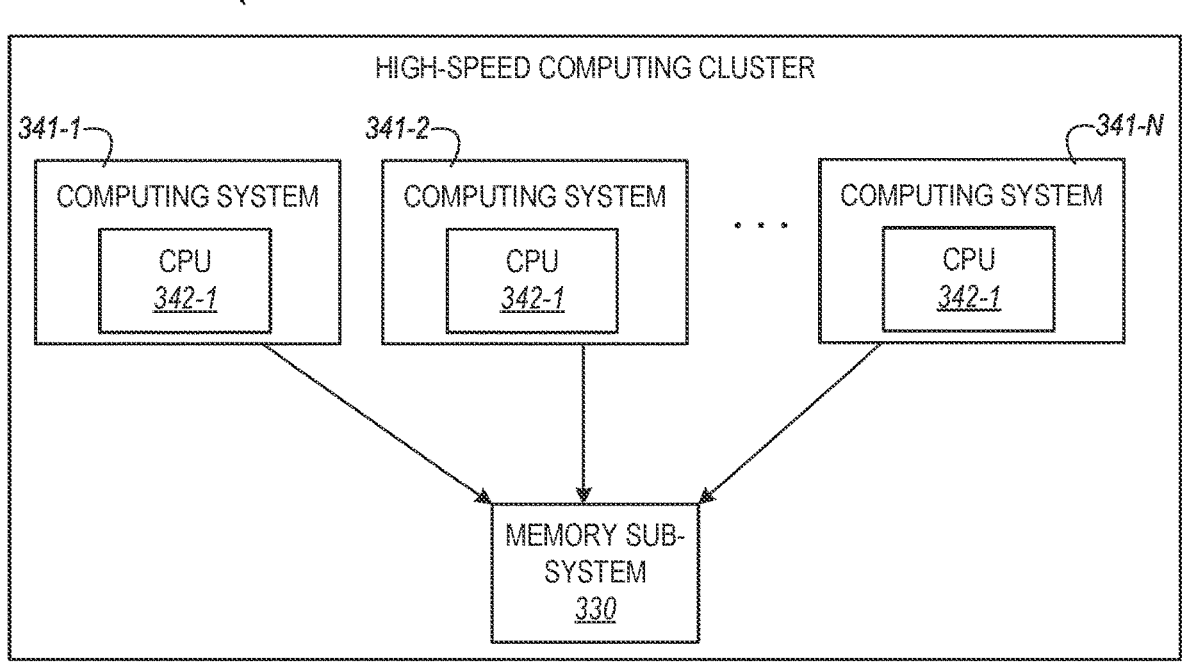

FIG. 3 illustrates an example high-speed computing cluster 340 that includes a memory sub-system 310 in accordance with some embodiments of the present disclosure. The memory sub-system 310 can be analogous to the memory sub-system 110 illustrated in FIG. 1, herein. As described above, a computing cluster and, more specifically, the high-speed computing cluster 340, is a set of computing systems that operate in concert and can therefore behave as a single computing system. The computing systems 341-1 to 341-N can be physically coupled (e.g., a physical data center or supercomputer architecture) or can be wirelessly connected (e.g., as a software-defined data center or cloud computing deployment).

In a non-limiting example, a system (e.g., the computing system 100 illustrated in FIG. 1, herein) includes a computing cluster (e.g., the high-speed computing cluster 340) comprising a plurality of computing systems 341-1 to 341-N (which can be analogous to at least a portion of the computing system 100 illustrated in FIG. 1, herein) that each comprise a respective central processing unit 342-1 to 342-N. The system can include a cluster-shared memory sub-system (e.g., the memory sub-system 310) that comprises at least a safe area (e.g., the safe area 235 illustrated in FIG. 2) comprising a plurality of capacitors and a persistent memory area (e.g., the memory arrays 237 illustrated in FIG. 2) comprising a plurality of memory cells.

Continuing with this example, a controller (e.g., the safe area control component 113 illustrated in FIG. 1 and/or the frontend controller 238 illustrated in FIG. 2) can be coupled to the computing cluster and the cluster-shared memory sub-system. The controller can cause information comprising a state of the computing cluster to be written to the safe area of the cluster-shared memory sub-system and determine that a power event involving the computing cluster has occurred, as described above. The controller can be further configured to cause, responsive to the determination that the power event has occurred, the information written to the safe area of the cluster-shared memory sub-system to be written to or retrieved from the persistent memory area of the cluster-shared memory sub-system.

The controller can determine that the power event is a power-up event and write the information from the safe area of the cluster-shared memory sub-system to the persistent memory area of the cluster-shared memory sub-system. In such embodiments, the controller can further determine, based on the information written to the safe area of the memory sub-system, that a particular operation is to be performed in response to the power-up event and cause performance of the particular operation. A non-limiting example of such a particular operation can be a sanitization operation, as described herein, although embodiments are not so limited.

In some embodiments, the controller can determine that the power event is an asynchronous power loss event, as described herein. In such embodiments, the controller can write, responsive to the determination that the power event is the asynchronous power event, the information written to the safe area of the cluster-shared memory sub-system to the persistent memory area of the cluster-shared memory sub-system.

As discussed in connection with FIG. 2, the safe area of the cluster-shared memory sub-system is deployed in a frontend portion (e.g., the frontend portion 231 illustrated in FIG. 2) of the cluster-shared memory sub-system. In such embodiments, controller can be further configured to request, responsive to the determination that the power event has occurred, control of the frontend portion of the cluster-shared memory sub-system from a flash translation layer (e.g., the FTL core 234 illustrated in FIG. 2) associated with the cluster-shared memory sub-system to control the safe area.

Figure 4:
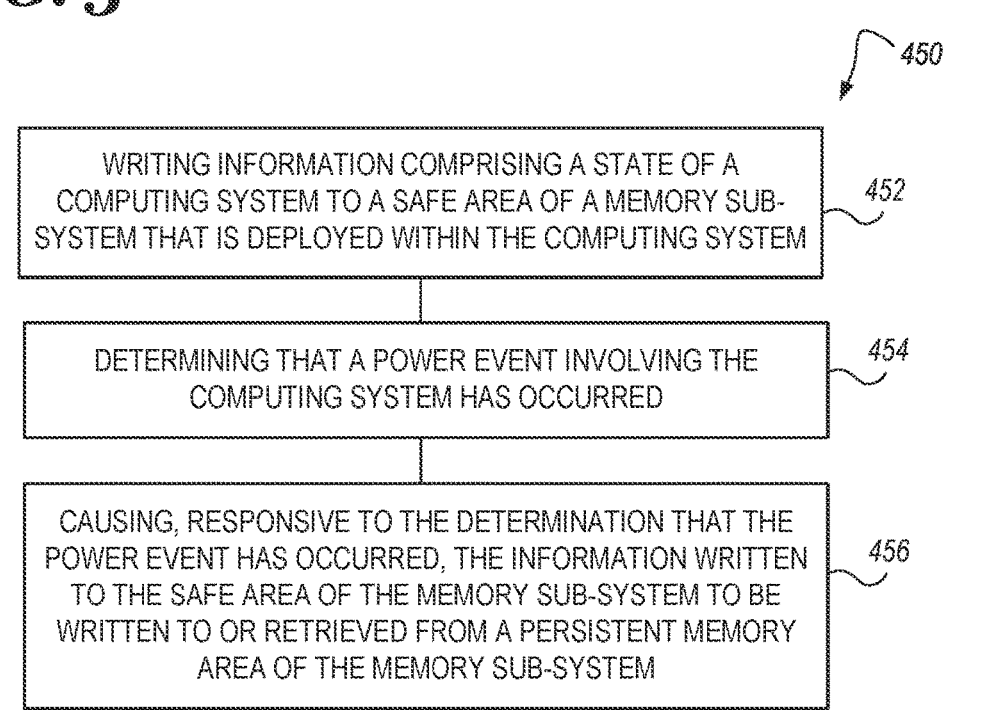
FIG. 4 is a flow diagram corresponding to a method for a safe area for critical control data in accordance with some embodiments of the present disclosure.

FIG. 4 is a flow diagram corresponding to a method 450 for a safe area for critical control data in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the safe area control component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 452, the method 450 includes writing information comprising a state of a computing system to a safe area of a memory sub-system that is deployed within the computing system. The computing system can be analogous to the computing system 100 illustrated in FIG. 1 or can be a portion of a computing system, such as the memory device 130/230 illustrated in FIG. 1 and FIG. 2, herein. The memory sub-system can be analogous to the memory sub-system 110 illustrated in FIG. 1, herein. The safe area can be analogous to the safe area 235 illustrated in FIG. 2, herein.

In some embodiments, writing the information comprising the state of the computing system to the safe area of the memory sub-system can include writing at least one of self-monitoring, analysis and reporting technology information, name server identification hardware permission control information, persistent configuration information, debugging information, or any combination thereof to the safe area of the memory sub-system. In some embodiments, writing the information comprising the state of the computing system to the safe area of the memory sub-system can include writing the information comprising the state of the computing system to a plurality of capacitors that comprise the safe are of the memory sub-system.

At operation 454, the method 450 includes determining that a power event involving the computing system has occurred. As described above, the power event can be a power loss event or a power-up event.

At operation 456, the method 450 includes causing, responsive to the determination that the power event has occurred, the information written to the safe area of the memory sub-system to be written to or retrieved from a persistent memory area of the memory sub-system. The persistent memory area of the memory system can be one or more of the flash arrays 237 illustrated in FIG. 2, herein. The method 340 can further include causing the information written to the safe area of the memory sub-system to be written to or retrieved from the persistent memory area of the memory sub-system in the absence of execution of a memory management command.

In some embodiments, the information can be retrieved from the persistent area of the memory system in response to a power loss event and can be written to the persistent area of the memory system in response to a power-up event. For example, in some embodiments, the method 450 can include determining that the power event involving the computing system is an asynchronous power loss event and writing, responsive to the determination that the power event is the asynchronous power event, the information written to the safe area of the memory sub-system to the persistent memory area of the memory sub-system. Conversely, the method 340 can, in some embodiments, include determining that the power event involving the computing system is a power-up power event and writing, responsive to the determination that the power event is the power-up power event, the information written to the persistent memory area of the memory sub-system to the safe area of the memory sub-system.

In some embodiments, the method 450 can include determining, based on the information written to the safe area of the memory sub-system, that a particular operation is to be performed in response to the power-up event and performing the particular operation in response to the power-up event. For example, if a sanitization operation was not completed prior to a power loss event, the method 340 can include determining, based on the information written to the safe area of the memory sub-system, that a sanitization operation is to be performed in response to the power-up event and performing the sanitization operation in response to the power-up event.

Figure 5:
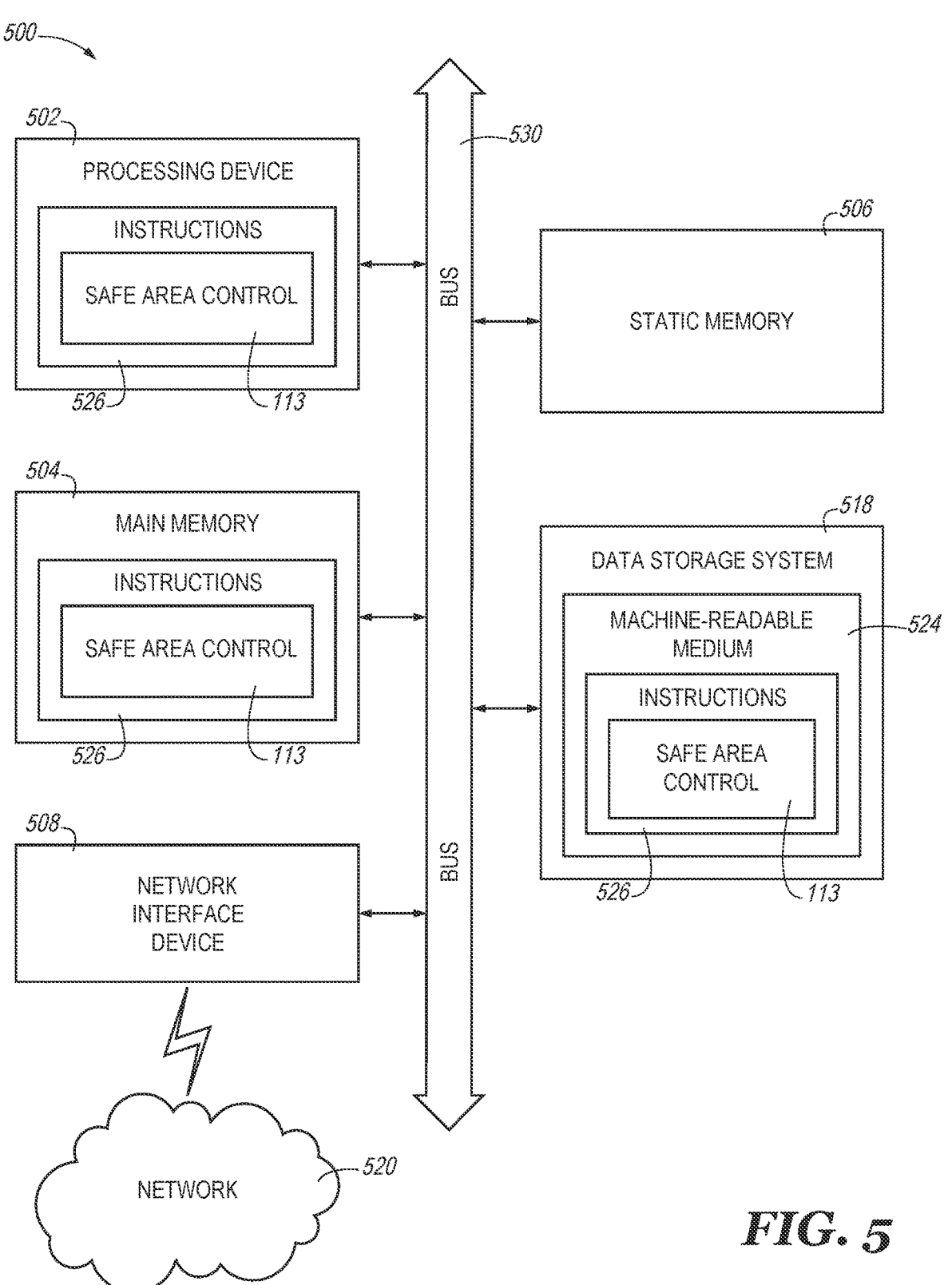
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the safe area control component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a safe area control component (e.g., the safe area control 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

writing flash translation layer (FTL) control data together with information comprising a state of a computing system to a safe area of a memory sub-system that is deployed within a frontend controller the computing system, wherein the frontend controller comprises the safe area and a firmware portion that includes a FTL core to manage the safe area, wherein the frontend controller is a portion of a memory controller of the memory sub-system and the safe area provides parity protection by implementing header signature and/or footer signature checks responsive to power events to ensure data integrity;

determining that a power event involving the computing system has occurred; and causing, responsive to the determination that the power event has occurred, the information written to the safe area of the memory sub-system to be written to or retrieved from a persistent memory area of the memory sub-system.

2. The method of claim 1, further comprising writing the information comprising the state of the computing system to the safe area of the memory sub-system by writing the information comprising the state of the computing system to a plurality of capacitors that comprise the safe area of the memory sub-system, wherein data written to the safe area is utilized to determine when operations were being performed when the power event occurred.

3. The method of claim 1, further comprising:

determining that the power event involving the computing system is an asynchronous power loss event; and writing, responsive to the determination that the power event is the asynchronous power event, the information written to the safe area of the memory sub-system to the persistent memory area of the memory sub-system.

4. The method of claim 1, further comprising:

determining that the power event involving the computing system is a power-up power event;

writing, responsive to the determination that the power event is the power-up power event, the information written to the persistent memory area of the memory sub-system to the safe area of the memory sub-system;

determining, based on the information written to the safe area of the memory sub-system, that a particular operation is to be performed in response to the power-up event; and performing the particular operation in response to the power-up event.

5. The method of claim 1, further comprising writing the information comprising the state of the computing system to the safe area of the memory sub-system by writing at least one of self-monitoring, analysis and reporting technology information, name server identification hardware permission control information, persistent configuration information, debugging information, or any combination thereof to the safe area of the memory sub-system.

6. An apparatus, comprising:

a memory sub-system configured such that at least a first portion of the memory sub-system comprises a safe area and at least a second portion comprises a persistent memory area, wherein the safe area is deployed within a frontend controller of a memory controller that includes a firmware portion that includes a flash translation layer (FTL) core to manage the safe area, wherein the frontend controller is a portion of the memory controller of the apparatus and the safe area provides parity protection by implementing header signature and/or footer signature checks responsive to power events to ensure data integrity; and wherein the memory controller is configured to:

cause information comprising a state of a computing system in which the memory sub-system is deployed to be written together with FTL control data to the safe area of the memory sub-system;

determine that a power event involving the computing has occurred; and cause, responsive to the determination that the power event has occurred, the information written to the safe area of the memory sub-system to be written to or retrieved from the persistent memory area of the memory sub-system.

7. The apparatus of claim 6, wherein the power event comprises a power-up event or a power loss event and the power loss event comprises a controlled power down event or an asynchronous power loss event.

8. The apparatus of claim 6, wherein the memory controller is further configured to:

determine that the power event is an asynchronous power loss event; and cause, responsive to the determination that the power event is the asynchronous power event, the information written to the safe area of the memory sub-system to be written to the persistent memory area of the memory sub-system.

9. The apparatus of claim 6, wherein the memory controller is further configured to:

determine that the power event is a power-up power event; and cause, responsive to the determination that the power event is the power-up power event, the information written to the persistent memory area of the memory sub-system to be written to the safe area of the memory sub-system.

10. The apparatus of claim 9, wherein the memory controller is further configured to:

determine, based on the information written to the safe area of the memory sub-system, that a particular operation is to be performed in response to the power-up event, wherein the particular operation is a sanitize operation; and cause performance of the particular operation.

11. The apparatus of claim 6, wherein the memory controller is configured to initiate a first synchronization point in response to a power-up and initiate a second synchronization point in response to a power loss, and wherein the first synchronization point and the second synchronization point are points where control of the safe area is passed from the frontend controller to the FTL core.

12. The apparatus of claim 6, wherein the information comprising the state of the computing system includes self-monitoring, analysis and reporting technology information, name server identification hardware permission control information, persistent configuration information, debugging information, or any combination thereof.

13. A system, comprising:

a computing cluster comprising a plurality of computing systems that each comprise a respective central processing unit;

a cluster-shared memory sub-system comprising at least a safe area comprising a plurality of capacitors and a persistent memory area comprising a plurality of memory cells, wherein the safe area is deployed within a frontend controller that is a portion of a memory controller that includes a firmware portion that includes a flash translation layer (FTL) core to manage the safe area, wherein the safe area provides parity protection by implementing header signature and/or footer signature checks responsive to power events to ensure data integrity; and the memory controller coupled to the computing cluster and the cluster-shared memory sub-system, wherein the memory controller is configured to:

cause information comprising a state of the computing cluster to be written together with FTL control data to the safe area of the cluster-shared memory sub-system;

determine that a power event involving the computing cluster has occurred; and cause, responsive to the determination that the power event has occurred, the information written to the safe area of the cluster-shared memory sub-system to be written to or retrieved from the persistent memory area of the cluster-shared memory sub-system.

14. The system of claim 13, wherein the memory controller is further configured to:

determine that the power event is a power-up event;

write the information from the safe area of the cluster-shared memory sub-system to the persistent memory area of the cluster-shared memory sub-system;

determine, based on the information written to the safe area of the memory sub-system, that a particular operation is to be performed in response to the power-up event; and cause performance of the particular operation.

15. The system of claim 13, wherein the memory controller is further configured to:

determine that the power event is an asynchronous power loss event; and write, responsive to the determination that the power event is the asynchronous power event, the information written to the safe area of the cluster-shared memory sub-system to the persistent memory area of the cluster-shared memory sub-system.

16. The system of claim 13, wherein the memory controller can be further configured to request, responsive to the determination that the power event has occurred, control of the frontend portion of the cluster-shared memory sub-system from the FTL core associated with the cluster-shared memory sub-system to control the safe area.

17. The system of claim 13, wherein the safe area of the cluster-shared memory sub-system is deployed in a frontend portion of the cluster-shared memory sub-system and wherein the memory controller is further configured to request, responsive to the determination that the power event has occurred, control of the frontend portion of the cluster-shared memory sub-system from a flash translation layer associated with the cluster-shared memory sub-system to control the safe area.

* * * * *